United States Patent [19]

Greschler et al.

[11] Patent Number: 5,515,078
[45] Date of Patent: May 7, 1996

[54] VIRTUAL-REALITY POSITIONAL INPUT AND DISPLAY SYSTEM

[75] Inventors: David Greschler, Boston; William Tremblay, Brighton; Eben Gay, Southborough, all of Mass.

[73] Assignee: The Computer Museum, Inc., Boston, Mass.

[21] Appl. No.: 209,956

[22] Filed: Mar. 11, 1994

Related U.S. Application Data

[63] Continuation of Ser. No. 898,058, Jun. 12, 1992, abandoned.

[51] Int. Cl.⁶ .................................................. G09G 5/08
[52] U.S. Cl. ..................... 345/156; 345/161; 273/148 B
[58] Field of Search .................................. 340/706, 709, 340/710; 345/156, 157, 158, 161; 341/20, 21; 273/148 B, 85 G, 433, 434, 313, 438; 434/247, 307, 30 D, 29 D; 482/902, 8, 5, 112

[56] References Cited

U.S. PATENT DOCUMENTS

| | | | |
|---|---|---|---|
| 3,983,474 | 9/1976 | Kuipers | 324/43 R |
| 4,017,858 | 4/1977 | Kuipers | 343/100 R |
| 4,164,080 | 8/1979 | Kosydar et al. | 35/12 |
| 4,391,444 | 7/1983 | Bromley | 273/85 G |
| 4,406,532 | 9/1983 | Howlett | 354/114 |
| 4,461,470 | 7/1984 | Astroth et al. | 273/85 G |
| 4,542,291 | 9/1985 | Zimmerman | 250/231 R |
| 4,757,714 | 7/1988 | Purdy et al. | 73/597 |
| 4,895,376 | 1/1990 | Shiung-Fei | 273/434 |
| 4,937,444 | 6/1990 | Zimmerman | 250/231.1 |
| 4,945,305 | 7/1990 | Blood | 324/207.17 |
| 4,984,179 | 1/1991 | Waldern | 364/514 |
| 4,988,981 | 1/1991 | Zimmerman et al. | 340/709 |
| 5,003,300 | 3/1991 | Wells | 340/705 |
| 5,054,771 | 10/1991 | Mansfield | 434/247 |
| 5,275,565 | 1/1994 | Moncrief | 434/29 |

FOREIGN PATENT DOCUMENTS 0252992  10/1989  Japan ..................................... 345/156

OTHER PUBLICATIONS

Tole, Yorker, and Renshaw; *A Microprocessor–Controlled Vestibular Examination Chair*, IEEE Transactions on Biomedical Engineering, vol. BME–28, No. 5, May 1981, pp. 390–395.

Sense8 Corporation, World Tool Kit Reference Manual, 1991.

SkyMall Gift Folio, Movement–Controlled Video Game Chair, 1994.

*Primary Examiner*—Richard Hjerpe
*Assistant Examiner*—Chanh Nguyen
*Attorney, Agent, or Firm*—Bromberg & Sunstein

[57] ABSTRACT

A system for receiving positional information and displaying a virtual world based on the positional information. The system includes a base and a chair that may be rotated with respect to the base by the user of the system. A monitor is attached to the chair so that it moves with the chair. A measuring device determines the rotational position of the chair. Joysticks are provided, and the bases of the joysticks are attached to the chair or the monitor so that they move with the chair. Data from the joysticks and from the rotational-position measuring device are sent to a processor, which accesses a data base defining a virtual world and generates an image on the monitor. The monitor image represents apparent movement within and through the virtual world represented by the databases.

3 Claims, 5 Drawing Sheets

VIRTUAL-REALITY POSITIONAL INPUT AND DISPLAY SYSTEM

This application is a continuation of application Ser. No. 07/898,058, which was filed Jun. 12, 1992, now abandoned.

SUMMARY OF THE INVENTION

The present invention is a system for receiving positional information and displaying a virtual world based on the positional information. The system includes a base and a chair that may be rotated with respect to the base by a user of the system. A measuring device determines the rotational position of the chair. A monitor is attached to the chair, so that, as the chair and user move, the monitor also moves. Likewise, in a preferred embodiment, joystick bases are also attached to the chair, so that, as the chair and user move, the joystick bases also move. In a preferred embodiment, the joystick bases are attached on the sides of the monitor. Joysticks are movably mounted to the joystick bases; the joysticks should be mounted so that they can be manipulated by the user. Joystick-position measuring devices, e.g., encoders, which are attached to the joysticks can determine the positions of the joysticks with respect to the joystick bases. Data from the various position measurement means, i.e., the chair position means and the joystick position means, are sent to a processing unit. The processing unit accesses a database defining a virtual world and uses the data from the position measurement means to generate an image on a monitor. The monitor image represents apparent movement within and through the virtual world represented by the database.

DESCRIPTION OF SPECIFIC EMBODIMENTS

Figure 1:
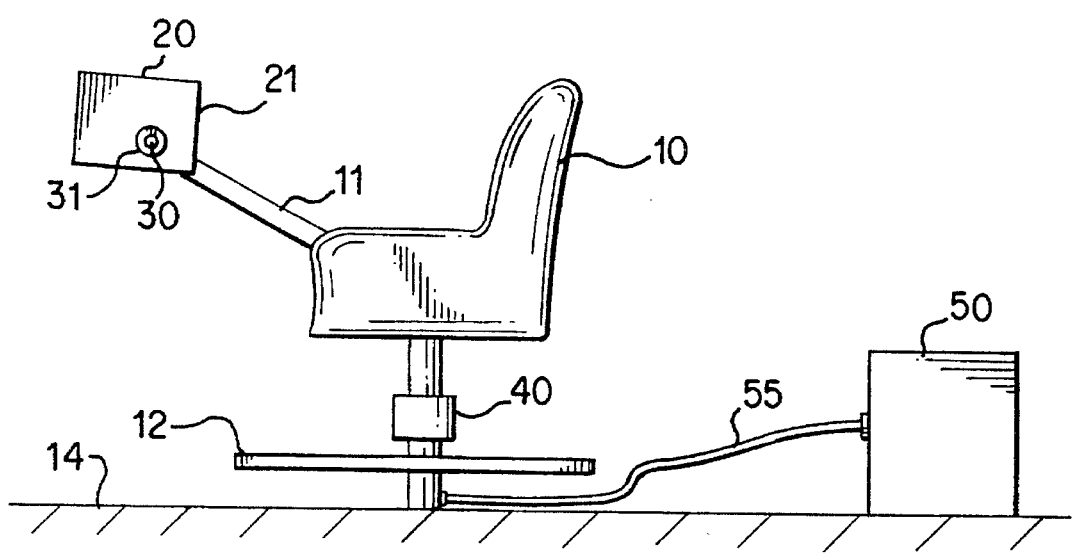
FIG. 1 shows a side view of the invention.
Figure 4:
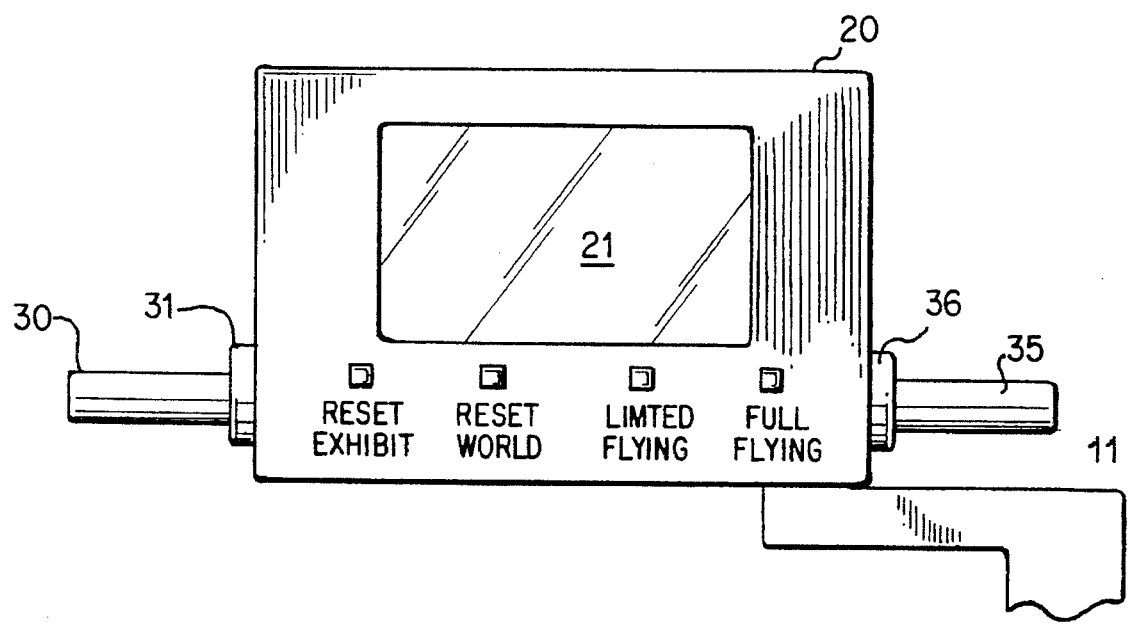
FIG. 4 shows the front of the monitor, which faces the user of the system.
Figure 5:
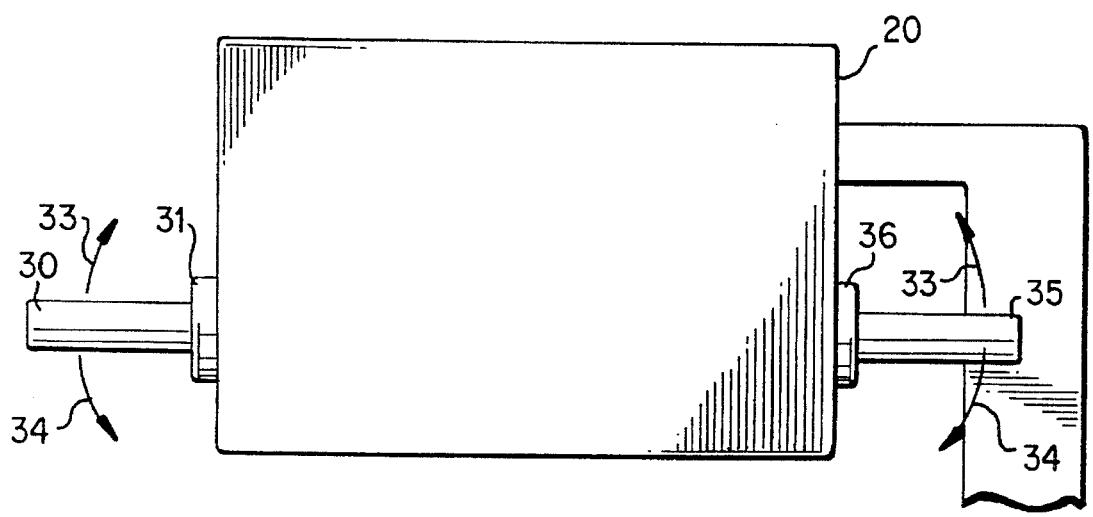
FIG. 5 shows a top view of the monitor.
Figure 6:
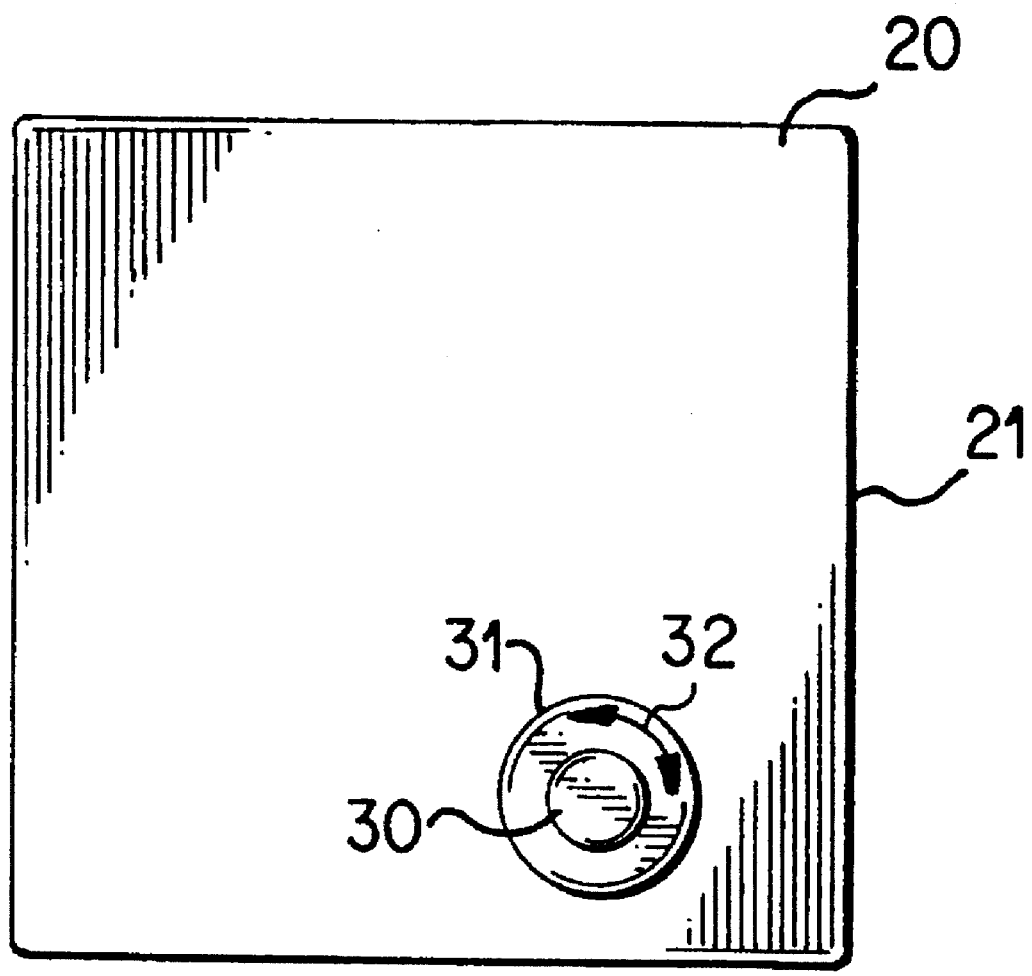
FIG. 6 shows a side view of the monitor.

FIG. 1 shows a preferred embodiment, which includes a chair 10 that may swivel with respect to the floor 14 when a user sitting in the chair 10 pushes with his or her feet a plate 12 mounted below the chair. The plate 12 does not move with respect to the floor 14. A video monitor 20 is fixedly attached to the chair 10 by an arm 11 so that the user sitting in the chair 10 faces the monitor 21. Attached to each side of the monitor and extending horizontally from the each side of the monitor is a joystick 30, 35 which can be manipulated by the user. The joysticks 30, 35 have two degrees of freedom: they can be pushed forward and backward by the user (as shown in FIG. 5 by arrows 33 and 34 respectively), and they can be twisted by the user so that the handle portions rotate with respect to their bases 31, 36 (as shown in FIG. 6 by the double-ended arrow 32). Below the monitor screen 21 are four buttons: "RESET EXHIBIT," "RESET WORLD," "LIMITED FLYING" and "FULL FLYING," as shown in FIG. 4.

The joysticks 30, 35 are attached to encoders which generate a signal based on the position of the joystick. The chair 10 itself is attached to a rotational measuring device 40 which generates a signal based on the rotational position of the chair. A computer 50 is preferably located near the chair and receives the signals from the encoders, the rotational measuring device and the buttons via a cable 55 attached to a parallel port on the computer.

Figure 2:
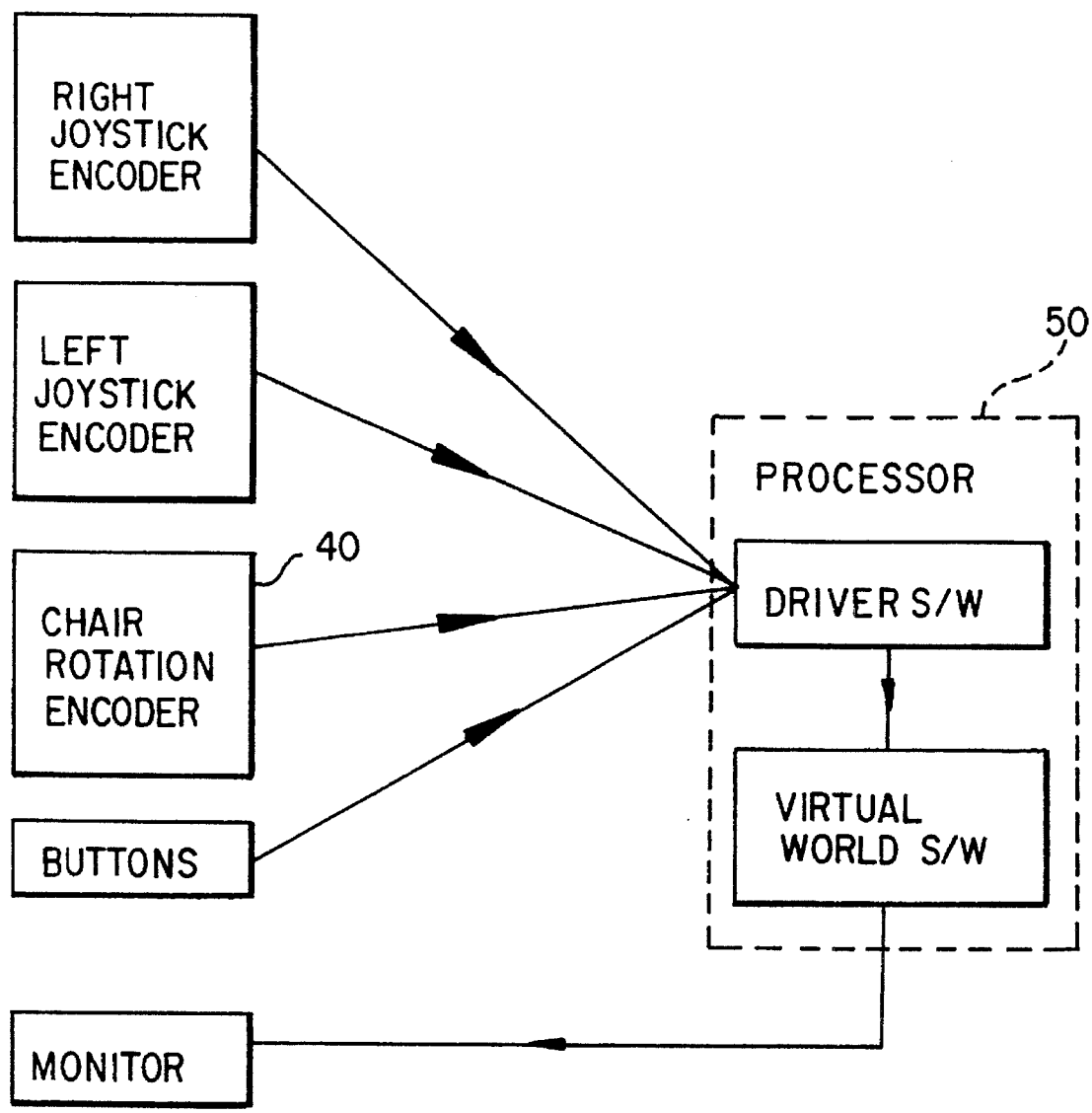
FIG. 2 shows schematically the flow of data through the system.

Referring to FIG. 2, the computer 50 runs a virtual-world program called WorldToolKit™ published by Sense8 Corporation, Sausalito, Calif. This program and the reference manual therefor are incorporated herein by reference. Another piece of software includes a driver program, which interprets the signals from the encoders and the rotational measuring device for the virtual-world program. The virtual-world program has stored therein data regarding several virtual worlds. The virtual-world program interprets the positional information received from the encoders and the rotational measuring device to create virtual movement through a virtual world. The output of the virtual-world program creates on the video monitor an image representing the virtual movement through the virtual world.

Figure 3:
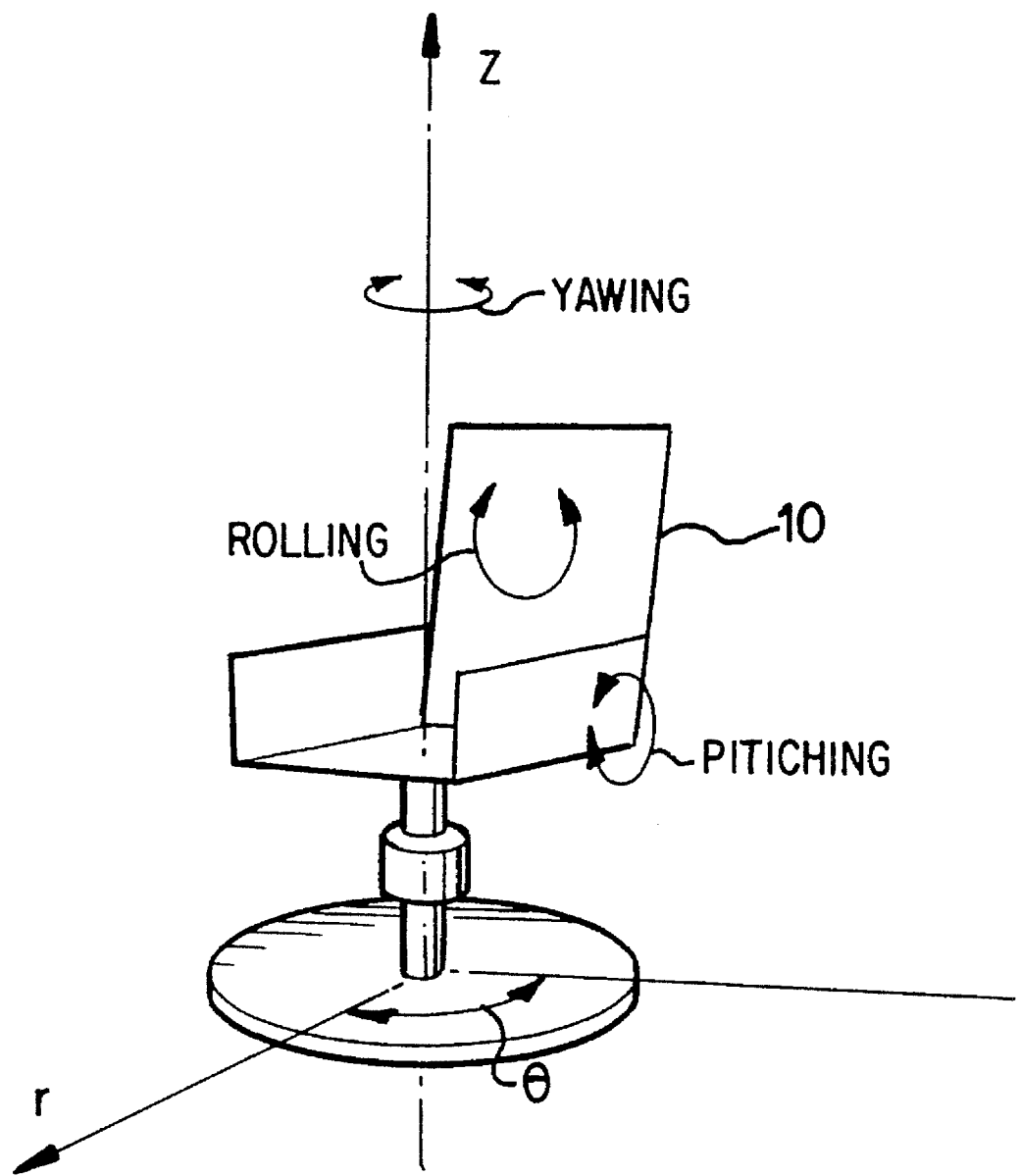
FIG. 3 shows the axes of virtual movement with respect to the chair.

FIG. 3 shows a convenient coordinate system for describing the virtual movement. The rotation of the chair is represented by "θ" (theta). Virtual movement up and down is represented by "z." Virtual movement away from the chair is represented by "r."

Virtual rotation or yawing (movement of the θ-coordinate) is accomplished by actual rotation of the chair, which the user can effect by simply pushing along the plate or the floor with his or her feet. Virtual movement along the r-coordinate is accomplished by pushing both joysticks forward or pulling both backward. Pushing the joysticks forward away from the user (see arrows 33 in FIG. 5) causes an increase in the r-coordinate, and pulling both joysticks closer to the user (see arrows 34) decreases the r-coordinate.

Virtual movement along the z-coordinate is accomplished only when the system is in the "limited flying mode." The system is put into the limited flying mode by pushing the "LIMITED FLYING" button. Once in the limited flying mode, virtual movement along the z-axis is accomplished by twisting the joysticks-i.e., wrist rolling (see double-ended arrow 32 in FIG. 6)-in the same direction.

When the "FULL FLYING" button is pushed, the system is put into the "full flying mode." When, during the full flying mode, the two joysticks are twisted in the same direction, a virtual pitching motion is generated (as compared to the virtual translation along the z-axis that occurs when the same movement is done in the limited flying mode). When, in the full flying mode, the two joysticks are twisted in opposite directions, a virtual rolling motion is generated.

The two buttons on the monitor that have not yet been described are reset buttons. The "RESET EXHIBIT" button resets the system to the start of all the virtual worlds. The "RESET CURRENT WORLD" resets the system to the start of the virtual world that the system is in.

Alternatively, a gyroscopically stabilized position transducer may be attached to the frame, for providing a signal indicative of the position of the chair. Like the chair position measuring device 40 discussed above, the gyroscopically stabilized transducer forwards position information to the processor as the chair is moved. The use of a gyroscope permits the monitor 20, arm 11 and one end of the cable 55 to be attached to a regular swivel chair, which can then be used like the chair 10 discussed above. It is expected that the computer hardware could be miniaturized so that the computer itself can also be mounted on a chair.

What is claimed is:

1. A virtual-reality positional input and display system, the system being mounted on a fixed base, the system comprising:

a seat which, upon the exertion of force against the base by legs of a user sitting in the seat, rotates around an approximately vertical axis with respect to the base;

seat-position means for providing a signal indicative of the seat's rotational position with respect to the base;

display means, affixedly mounted with respect to the seat, for displaying a scene to the user seated in the rotatable seat;

first and second joysticks, each joystick having a base and a movable portion, the base being affixedly mounted with respect to the display means, the movable portion being manipulable by a hand of the user seated in the rotatable seat, wherein each joystick is arranged substantially horizontally;

first joystick-position means for providing a signal indicative of the position of the first joystick's movable portion with respect to its base;

second joystick-position means for providing a signal indicative of the position of the second joystick's movable portion with respect to its base; and processing means, having an input in communication with the seat-position means, the first and second joystick-position means and a database defining a virtual world, for providing as an output to the display means signals for generating a scene in the virtual world dependent at least in part on the seat position and the positions of the joysticks, wherein actual rotation of the seat causes the displayed scene to represent a corresponding rotation in the virtual world, and wherein movement of the movable portions of the joysticks causes the displayed scene to represent movement in the virtual world without causing actual movement of the seat.

2. A system according to claim 1, wherein the joysticks are mounted substantially horizontally and coaxially on opposite sides of the display means.

3. A system according to claim 2, wherein, when the joysticks are pushed away from the user seated in the rotatable seat, the pushing of the joysticks causes the displayed scene to represent forward motion in the virtual world, and, when the joysticks are pulled towards the user seated in the rotatable seat, the pulling of the joysticks causes the displayed scene to represent backward motion in the virtual world.

* * * * *